(12) United States Patent
Winsor et al.

(10) Patent No.: US 7,540,279 B2
(45) Date of Patent: Jun. 2, 2009

(54) HIGH EFFICIENCY STOICHIOMETRIC INTERNAL COMBUSTION ENGINE SYSTEM

(75) Inventors: Richard Edward Winsor, Waterloo, IA (US); Scott Allen Chase, Cedar Falls, IA (US)

(73) Assignee: Deere & Comapny, Moline, IL (US)

( * ) Notice: Subject to any disclaimer, the term of this patent is extended or adjusted under 35 U.S.C. 154(b) by 77 days.

(21) Appl. No.: 11/748,861

(22) Filed: May 15, 2007

(65) Prior Publication Data

US 2008/0288157 A1 Nov. 20, 2008

(51) Int. Cl.
*F02B 33/38* (2006.01)

(52) U.S. Cl. .................. 123/679; 123/681; 123/704; 123/559.1; 123/565

(58) Field of Classification Search ............ 123/559.1, 123/559.3, 561, 565, 679, 681, 704
See application file for complete search history.

(56) References Cited

U.S. PATENT DOCUMENTS

| | | | |
|---|---|---|---|
| 4,802,457 A * | 2/1989 | Oscarsson ................ 123/564 |
| 4,910,959 A * | 3/1990 | Dones ..................... 60/280 |
| 5,133,309 A | 7/1992 | Ishii | |
| 5,553,575 A * | 9/1996 | Beck et al. .............. 123/198 F |
| 6,273,076 B1 * | 8/2001 | Beck et al. ................ 123/679 |
| 7,281,531 B1 * | 10/2007 | Fulton et al. ............ 123/568.17 |
| 7,395,668 B2 * | 7/2008 | Gobert et al. ............. 60/612 |
| 2006/0248878 A1 | 11/2006 | Tonetti et al. | |
| 2008/0000450 A1 | 1/2008 | Serra et al. | |

FOREIGN PATENT DOCUMENTS

EP      0990788 A2      4/2000

* cited by examiner

*Primary Examiner*—Erick Solis

(57) ABSTRACT

A power system including a stoichiometric compression ignition engine in which a roots blower is positioned in the air intake for the engine to control air flow. Air flow is decreased during part power conditions to maintain the air-fuel ratio in the combustion chamber of the engine at stoichiometric, thus enabling the use of inexpensive three-way catalyst to reduce oxides of nitrogen. The roots blower is connected to a motor generator so that when air flow is reduced, electrical energy is stored which is made available either to the roots blower to temporarily increase air flow or to the system electrical load and thus recapture energy that would otherwise be lost in reducing air flow.

24 Claims, 1 Drawing Sheet

HIGH EFFICIENCY STOICHIOMETRIC INTERNAL COMBUSTION ENGINE SYSTEM

GOVERNMENT RIGHTS IN PATENT

This invention was made with Government support under contract DE-FC26-05NT42416 awarded by the Department of Energy. The United States Government has certain rights in this invention.

FIELD OF THE INVENTION

The present invention relates to internal combustion engine systems and more specifically to engines operating at stoichiometric air fuel ratios.

BACKGROUND OF THE INVENTION

Internal combustion engines come in a number of forms, the most common of which are spark ignited, gasoline fueled, engines and compression ignition ignited, diesel engines. Modern spark ignited, gasoline fueled, engines utilize air, either at atmospheric or above atmospheric pressure, and mix it with fuel, through an appropriate fuel metering system, to produce a mixture in the combustion chamber that is as close to stoichiometric as possible. The stoichiometric air-fuel ratio is the mass ratio at which all the fuel and all the air are combined in the combustion process. For gasoline fueled, spark ignited engines, the air-fuel ratio is 14.7-1. This characteristic enables appropriate exhaust aftertreatment using a three-way catalyst to reduce oxides of nitrogen in the engine exhaust.

The compression ignition, or diesel type, is used in many commercial and industrial engine power applications because of outstanding durability and fuel economy superior to the spark ignited, gasoline fueled, engine. The diesel engine utilizes the heat of compression of intake air into which a metered quantity of fuel is injected to produce combustion. The nature of the diesel engine cycle is that it has a variable air-fuel ratio that can under part power conditions rise to levels significantly above stoichiometric. This results in highly enhanced part power fuel economy since only the quantity of fuel needed for particular power levels is supplied to the engine.

While the diesel engine provides superior part-power fuel economy it has a combustion process making it more difficult to reduce the oxides of nitrogen with, for example, three-way catalyst. A conventional method to produce diesel engines having a stoichiometric air-fuel ratio would be to use a throttle normally used in a spark ignited gasoline engine to reduce intake air flow under part power conditions. The introduction of this throttling device, however simple, produces thermodynamic losses in the sense that the air into the engine is throttled and energy is wasted.

Accordingly, a need exists in the art to provide an internal combustion engine that system that minimizes losses that occur under part power conditions.

SUMMARY OF THE INVENTION

In one form, the invention is a power system including a fuel consuming internal combustion engine having at least an intake for combustion air and an exhaust for products of combustion. A positive displacement air handling device is placed in series air flow connection with the engine intake. A device is provided for controlling the air flow rate of the air handling device to maintain the air-fuel ratio of the engine at approximately a stoichiometric ratio whereby a three-way catalyst may be used to reduce nitrous oxide emissions in the exhaust of the internal combustion engine.

In another form, the invention is embodied in a method of operation of a fuel consuming air breathing compression ignition engine having an intake for air and an exhaust for products of combustion. The method includes the steps of operating the compression ignition engine and using a positive displacement air handling device in series flow connection with the engine intake to control the engine air-flow ratio to substantially stoichiometric whereby a three-way catalyst may be used to reduce nitrous oxide emissions in the exhaust of the compression ignition engine.

DETAILED DESCRIPTION OF THE INVENTION

Figure 1:
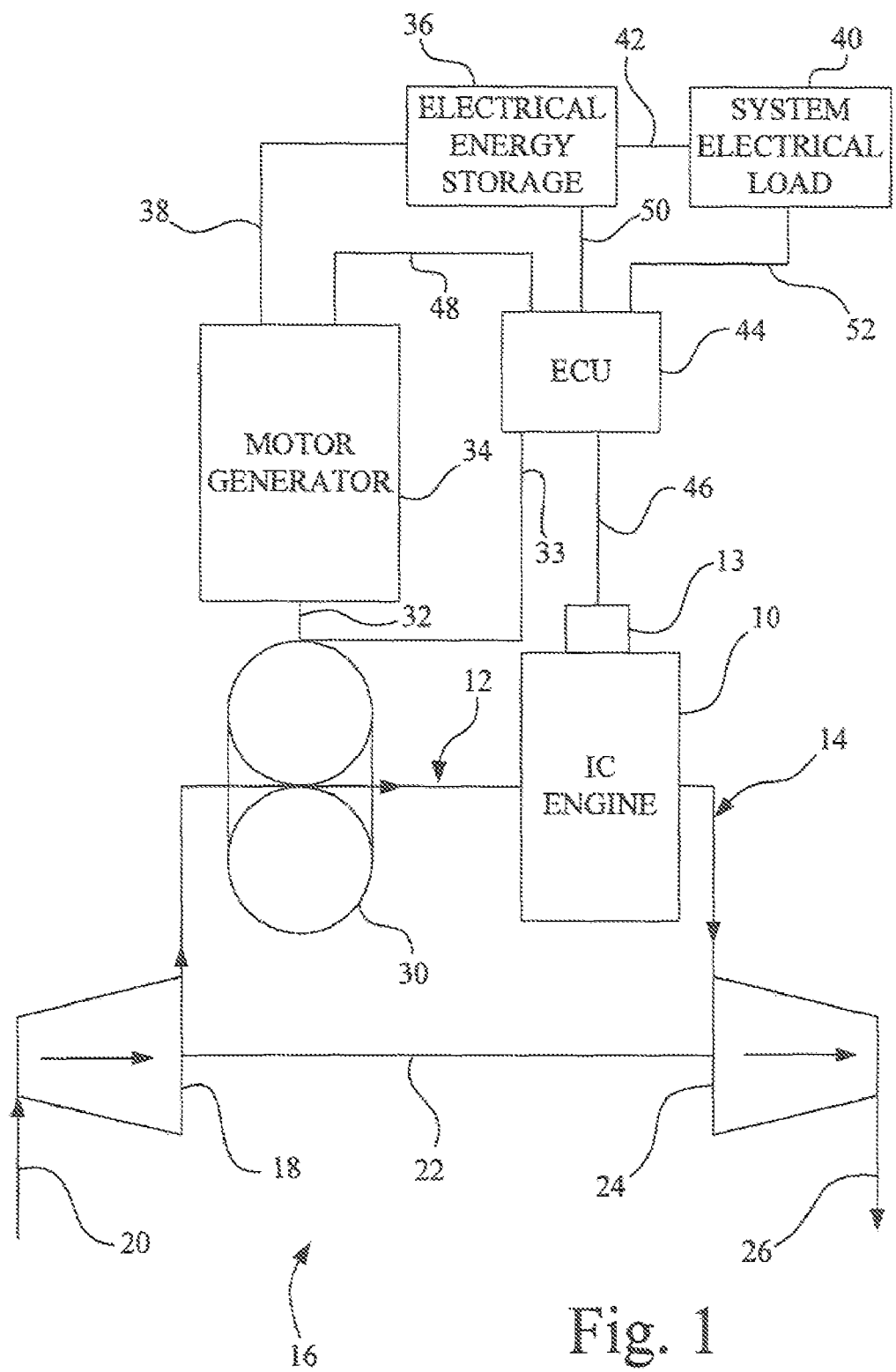
FIG. 1 shows a schematic drawing of a power system embodying the present invention.

FIG. 1 shows a power system having as its foundation an air breathing, fuel consuming, internal combustion engine 10 in which a one or more pistons reciprocate within an engine block and are connected to a crankshaft for producing a rotary output. Each piston forms part of a variable volume combustion chamber that receives air for combustion from an intake system 12. The products of combustion pass through an exhaust system 14. In typical fashion, poppet valves (not shown to simplify the understanding of the invention) are actuated by cam shafts to open at the appropriate point in the cycle to permit intake of air or allow exhaust of the products of combustion. As herein shown, the internal combustion engine is a compression ignition or diesel type. This engine is usually characterized by having a significantly high compression ratio for intake air so that in the compression process, the intake air is heated to a point that it will self-combust upon the injection of a hydrocarbon fuel. In such an engine, a fuel system 13 delivers a metered quantity of fuel at the appropriate time interval to produce the desired combination of power, fuel efficiency, and emissions reduction. Fuel system 13 produces the fuel quantity and timing in response to selected engine operating parameters and command from a fuel system controller, exemplified by an ECU (electronic control unit) 44, via a line 46. It should be noted that line 46 may be a multiplicity of cables sending and receiving signals between the ECU and fuel system.

In an attempt to further increase the efficiency of the engine 10, a turbocharger, identified by reference character 16 may be employed. Turbocharger 16 has a compressor 18 receiving intake air through conduit 20 and pressurizing it for delivery to the intake system 12. Consequently, the air entering the combustion chamber of the internal combustion engine 10 is at a higher density than obtainable from ambient air pressures and can produce greater power. The compressor is driven by a shaft 22 connected to a turbine 24 receiving the products of combustion from exhaust line 14 to be driven into rotation and thus drive compressor 18. The inlet to turbine 24 may employ variable geometry of different types to attempt to maintain gas velocity as high as possible for lower flow conditions experienced under part-power. The exhaust gases that have passed over turbine 24 exit the system through exhaust line 26 where they may be subjected to exhaust aftertreatment to reduce products in the exhaust system that are considered to be harmful to the environment.

As stated previously, one of the cost effective ways to reduce oxides of nitrogen ($NO_x$) is with a three-way catalyst.

However, to be able to utilize such a catalyst, the engine 10 must be operated in such a fashion that the ratio of the air to fuel consumed by the engine is approximately stoichiometric, usually considered 14.7 to 1. The mixture is based on air mass to fuel mass flow at the point of combustion.

In order to achieve approximately the stoichiometric ratio, a positive displacement air handling device 30 is interposed in the intake air line 12 in series air flow connection. The positive displacement air handling device preferably is a roots blower. The roots blower is described as a rotary lobe blower in which a pair of lobed impellers with an approximate "figure 8" shape is mechanically linked with gears so that the lobes rotate in opposite directions. The lobes are dimensioned so that a close clearance is maintained between the lobes and the housing in which they rotate. The roots blower is named after Francis and Philader Roots who applied this blower in practice in the U.S. in 1848.

This type of positive displacement air handling device can accommodate significant quantities of air and is characterized by no internal air compression. The roots principal has been developed over the years to produce inter-fitting lobes of spiral configuration to reduce pulsation and a greater number than two inter-fitting lobes, all of which provide a smoother delivery of air. The roots blower is also characterized by having a relatively low pressure ratio.

The roots blower 30 is connected by an appropriate mechanical interconnection 32 to a motor generator 34 that can drive, or be driven, by the roots blower 30. The motor generator 34 is connected to an electrical energy storage device 36 by an appropriate electrical interconnection 38. The electrical energy storage device 36 can deliver electrical energy back through line 38 to motor generator 34 or can supply electrical energy to a system electrical load identified by reference character 40 through an appropriate electrical interconnection 42. The system electrical load 40 represents all the various electrically powered devices found in a power system used as a prime mover for highway, agricultural or industrial applications.

As herein illustrated, the control of the system is provided by the electronic control unit (ECU) 44 that receives control signals from engine 10 via line 46. It should be noted that a separate ECU may also be employed, with appropriate connections to the controls for engine 10. Control signals to and from motor generator 34 pass through line 48, control signals to and from electrical energy storage device 36 pass through line 50, and finally control signals to and from the system electrical load pass through line 52. As described below, there is a signal line 33 between the roots blower 30 and the ECU 44 to provide a signal representing mass air flow, either by appropriate sensors or by sensing the rpm of roots blower 30. As noted above, the control signal lines may be cables with plurality of electrical conductors.

The electrical energy storage device 36, in one preferred embodiment, is a battery with a controller that permits the electrical energy to be stored by the battery or delivered up as commanded by the ECU 44. In another preferred form, the electrical energy storage device 36 may be a capacitor that stores energy within high capacity capacitors and can deliver it in response to command signals from the ECU 44. The electrical energy storage device 36 is adapted to either power the motor generator 34, or provide power to the system electrical load 40 as commanded by the ECU.

In operation, the internal combustion engine 10 is operated from the ECU 44 by sending signals to the fuel system 13 to deliver the appropriate quantity of fuel at the appropriate time to initiate combustion at or near the end of the compression cycle for the engine 10. Under high power output conditions, the roots blower simply responds to the flow of air through the intake 12 to maintain the air-fuel ratio of the engine at stoichiometric. However, under part power conditions where the unimpeded air flow would produce a higher air-fuel ratio, the motor generator 34 is operated as a generator, thereby applying load to the roots blower 30 to reduce the air flow through intake 12 to reach a stoichiometric air-fuel ratio as commanded by the ECU 44. The load thus applied to the roots blower 30 by the motor generator 34 is used to store electrical energy in the device 36. Thus, the energy that would normally be lost by a throttling process is available to either supply system electrical loads through 40 or to be stored for later use to temporarily increase the air flow in intake 12 to minimize lag that normally occurs in the turbocharger 16. The net result of such a system is a capturing of what is otherwise wasted energy for availability in the system electrical load or to temporarily increase air flow in the intake 12.

Although other types of positive displacement air handling devices may be employed, the roots blower 30 is advantageous in that it can be a very accurate sensor of air flow as utilized by sensor line 33 extending to ECU 44 to provide a signal that is reflective of the rpm of roots blower 30 and thus the air flow to the engine. Since techniques for measuring fuel consumed by fuel system 13 are well known and developed, the essential elements for computing air-fuel ratio are relatively simple and straightforward and do not require elaborate air flow sensing techniques.

Having described the preferred embodiment, it will become apparent that various modifications can be made without departing from the scope of the invention as defined in the accompanying claims.

The invention claimed is:

1. A power system comprising:
    a fuel consuming internal combustion engine having at least an intake for combustion air and an exhaust for products of combustion;
    a positive displacement air handling device, having a variable rate of operation producing a variable air flow rate and in series air-flow connection with said engine intake; and
    a device for controlling the rate of operation and air flow rate of said air handling device to maintain the air-fuel ratio of said engine at a stoichiometric ratio;
    whereby a three way catalyst may be used to reduce $NO_x$ emissions in the exhaust of said internal combustion engine.

2. The power system as claimed in claim 1, wherein said internal combustion engine is a stoichiometric compression ignition engine.

3. The power system as claimed in claim 2, wherein said positive displacement air handling device is a roots blower and said rate of operation is the rpm of said roots blower.

4. The power system as claimed in claim 3, wherein said roots blower is connected to an energy storage and energy release device.

5. The power system as claimed in claim 4, wherein said energy storage device comprises a motor generator connected to and selectively driving and being driven by said roots blower and said rate of operation is the rpm of said roots blower.

6. The power system as claimed in claim 1, wherein said positive displacement air handling device comprises a roots blower.

7. The power system as claimed in claim 6, wherein said roots blower is connected to an energy storage and delivery device for being driven by and selectively driving said roots blower.

8. The power system as claimed in claim 7, wherein said energy storage and delivery device comprises a motor generator, the output of which is connected to said roots blower whereby said motor generator is selectively being driven by said roots blower.

9. The power system as claimed in claim 8, further comprising a battery electrically interconnected with said motor generator for charging the battery when said roots blower is driving said motor generator.

10. The power system as claimed in claim 8, wherein said motor generator is connected to a capacitor for storing and releasing electrical energy.

11. The power system as claimed in claim 8, wherein said system further comprises system electrical loads and said energy storage and delivery device selectively delivers electrical power to said system loads.

12. The power system as claimed in claim 8, wherein said motor generator selectively powers said roots blower.

13. The power system as claimed in claim 12 further comprising a turbocharger driven by exhaust gases from said engine and pressurizing air to the intake thereof, and wherein said motor generator selectively drives said roots blower to compensate for turbocharger lag.

14. The power system as claimed in claim 6, further comprising a device for measuring the air-fuel ratio of said engine for controlling said roots blower to maintain the substantially stoichiometric ratio.

15. The power system as claimed in claim 14, wherein the device for measuring the air/fuel ratio comprises an engine electronic control unit (ECU).

16. The power system as claimed in claim 15, wherein the device for measuring the air/fuel ratio comprises a device for measuring the rpm of said roots blower to produce a signal proportional to the air flow rate of said engine.

17. A method of operating a fuel consuming, air breathing, compression ignition engine having an intake for air and an exhaust for products of combustion, said method comprising the steps of:

operating the compression ignition engine; and using a positive displacement air handling device having a variable rate of operation producing a variable air flow rate and in series flow connection in the engine intake and controlling the rate of operation of said positive displacement air handling device to control the engine intake air flow ratio to substantially a stoichiometric air-fuel ratio;

whereby a three way catalyst may be used to reduce $NO_x$ emissions in the exhaust of the compression ignition engine.

18. The method as claimed in claim 17 wherein said positive displacement air handling device is a roots blower and said rate of operation is the rpm of said roots blower.

19. The method as claimed in claim 18 wherein said roots blower has a load placed on it during part power engine conditions to reduce air flow in the engine intake to substantially a stoichiometric air-fuel ratio.

20. The method as claimed in claim 19 wherein said roots blower is connected to an energy storage and energy release device to selectively store energy during part power conditions and to release energy during other conditions.

21. The method as claimed in claim 20 wherein said energy storage and energy release device comprises a motor generator connected to said roots blower.

22. The method as claimed in claim 20 wherein said energy storage and energy release device further comprises a battery electrically connected to said motor generator.

23. The method as claimed in claim 18 wherein said roots blower is controlled by a controller to maintain said approximate stoichiometric air-fuel ratio.

24. The method as claimed in claim 23 wherein said controller receives an input proportional to the rpm of said roots blower to provide a signal directly proportional to the air flow in said engine intake.

* * * * *